US012440960B2

(12) United States Patent
Imsand

(10) Patent No.: US 12,440,960 B2
(45) Date of Patent: Oct. 14, 2025

(54) TOOL CONTAINER WITH MAGNETIC RETENTION ASSEMBLY FOR LID

(71) Applicant: Apex Brands, Inc., Apex, NC (US)

(72) Inventor: Nicholas Ryan Imsand, Huntersville, NC (US)

(73) Assignee: Apex Brands, Inc., Apex, NC (US)

( * ) Notice: Subject to any disclaimer, the term of this patent is extended or adjusted under 35 U.S.C. 154(b) by 353 days.

(21) Appl. No.: 18/017,488

(22) PCT Filed: Aug. 4, 2021

(86) PCT No.: PCT/US2021/044474
§ 371 (c)(1),
(2) Date: Jan. 23, 2023

(87) PCT Pub. No.: WO2022/031801
PCT Pub. Date: Feb. 10, 2022

(65) Prior Publication Data
US 2023/0271311 A1 Aug. 31, 2023

Related U.S. Application Data

(60) Provisional application No. 63/060,877, filed on Aug. 4, 2020.

(51) Int. Cl.
*B25H 3/02* (2006.01)

(52) U.S. Cl.
CPC .................................... *B25H 3/02* (2013.01)

(58) Field of Classification Search
CPC ....... B25H 3/02; A45C 13/28; A45C 13/1069; A45C 13/262
See application file for complete search history.

(56) References Cited

U.S. PATENT DOCUMENTS

| | | | | |
|---|---|---|---|---|
| 9,616,562 | B2 * | 4/2017 | Hoppe | B25H 3/02 |
| 10,611,017 | B1 * | 4/2020 | Panosian | A45F 5/1575 |
| 2017/0239808 | A1 * | 8/2017 | Hoppe | A45C 13/262 |
| 2018/0235333 | A1 * | 8/2018 | Capps-Tate | A45C 5/005 |
| 2023/0271311 | A1 * | 8/2023 | Imsand | A45C 13/1069 206/372 |

FOREIGN PATENT DOCUMENTS

CN 108813876 A 11/2018

OTHER PUBLICATIONS

Crescent 18" Tradesman Rolling Tool Bag—CTBR1850 (amazon.com) Apr. 17, 2020, entire webpage. https://www.amazon.com/Crescent-Tradesman-Rolling-Tool-Bag/dp/B0878BLRZJ?th=1.
International Search Report and Written Opinion of International Application No. PCT/US2021/044474 mailed Nov. 17, 2021, all pages cited in its entirety.

* cited by examiner

*Primary Examiner* — Jacob B Meyer
(74) *Attorney, Agent, or Firm* — Burr & Forman

(57) ABSTRACT

A tool container may include a container portion that includes a front wall, sidewalls, and a rear wall. The tool container may further include a lid hingedly attached to the rear wall, a mobility assembly including wheels and a handle assembly, and a magnetic retention assembly configured to hold the lid proximate to the handle assembly to retain the lid in an opened position.

20 Claims, 5 Drawing Sheets

TOOL CONTAINER WITH MAGNETIC RETENTION ASSEMBLY FOR LID

TECHNICAL FIELD

Example embodiments generally relate to containers for storing tools and, in particular, relate to a tool container with a lid configured to include a magnetic retention assembly for holding the lid.

BACKGROUND

Tool storage containers (e.g., tool boxes) are well known storage containers that have been important articles for organizing and storing tools for a long time. Tool storage containers enabled tools to be stored, transported, organized and secured. Like many devices, tool storage containers have historically come in many varieties, and have cycled through many different material compositions and designs as technology has improved. Wooden and metal storage containers, long valued for their durability, have now been replaceable (partly or completely) by fabrics that are extremely durable, yet much lighter, and therefore may now be referred to as tool bags.

Although tool bags may have many advantages, one notable disadvantage may be that, particularly when the lid of the tool bag is also fabric, the lid tends to consistently return to the closed position automatically after each cycle of opening for tool removal or return. Particularly when multiple tools, and therefore multiple entrances into the tool bag, are required for a job, the repeated lifting and holding of the lid may become tiresome or annoying.

Accordingly, it may be desirable to provide improvements to the design of the tool bag that may increase user satisfaction.

BRIEF SUMMARY OF SOME EXAMPLES

In an example embodiment, a tool container is provided. The tool container may include a container portion that includes a front wall, sidewalls, and a rear wall. The tool container may further include a lid hingedly attached to the rear wall, a mobility assembly including wheels and a handle assembly, and a magnetic retention assembly configured to hold the lid proximate to the handle assembly to retain the lid in an opened position.

In another example embodiment, another example of a tool container is provided. The a container portion may include a front wall, sidewalls, and a rear wall. The tool container may further include a lid hingedly attached to the rear wall, and a magnetic retention assembly configured to hold the lid proximate to the front wall when the lid is in a closed position and also hold the lid in an opened position.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
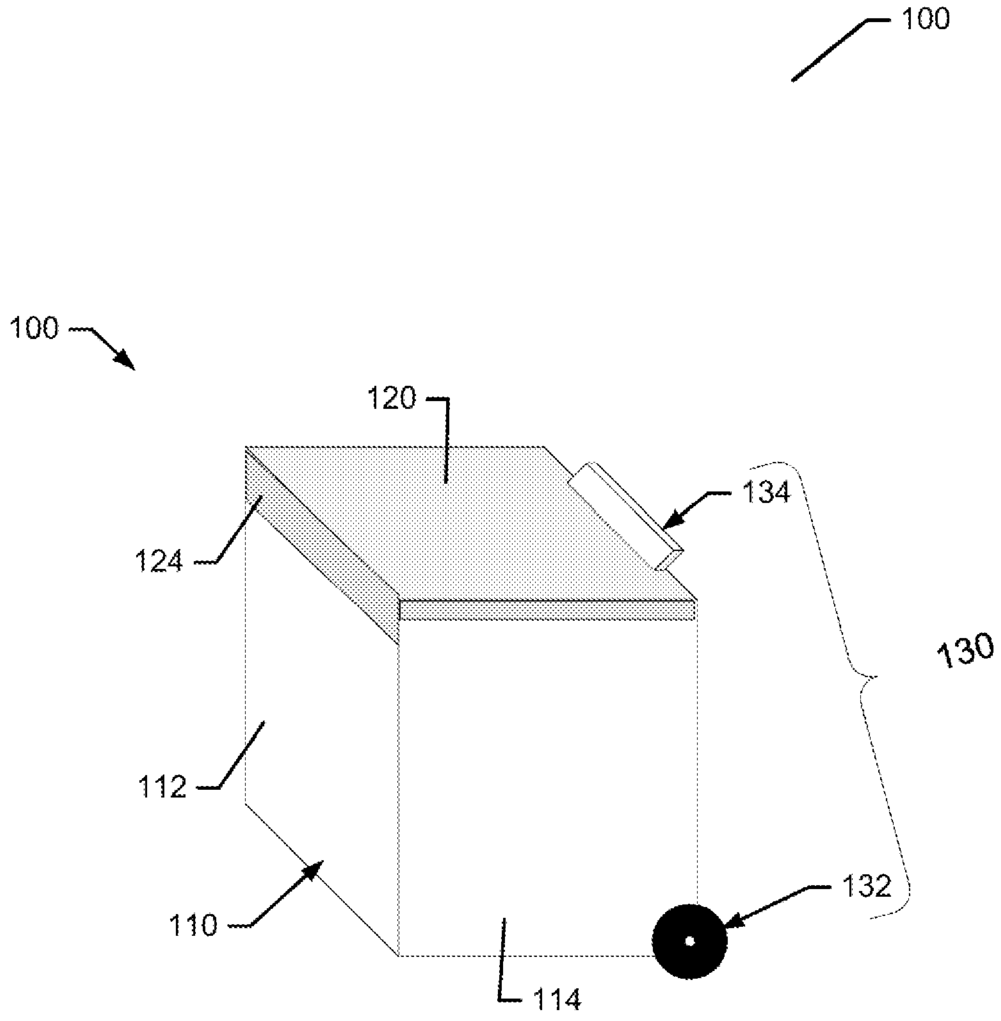
FIG. 1 illustrates a perspective view of a tool container according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of an improved tool storage container or tool bag design. In this regard, a tool bag in accordance with an example embodiment may be provided with a magnetic retention assembly in the lid. Moreover, the magnetic retention assembly may be configured to both hold the lid open and hold the lit closed.

Figure 2:
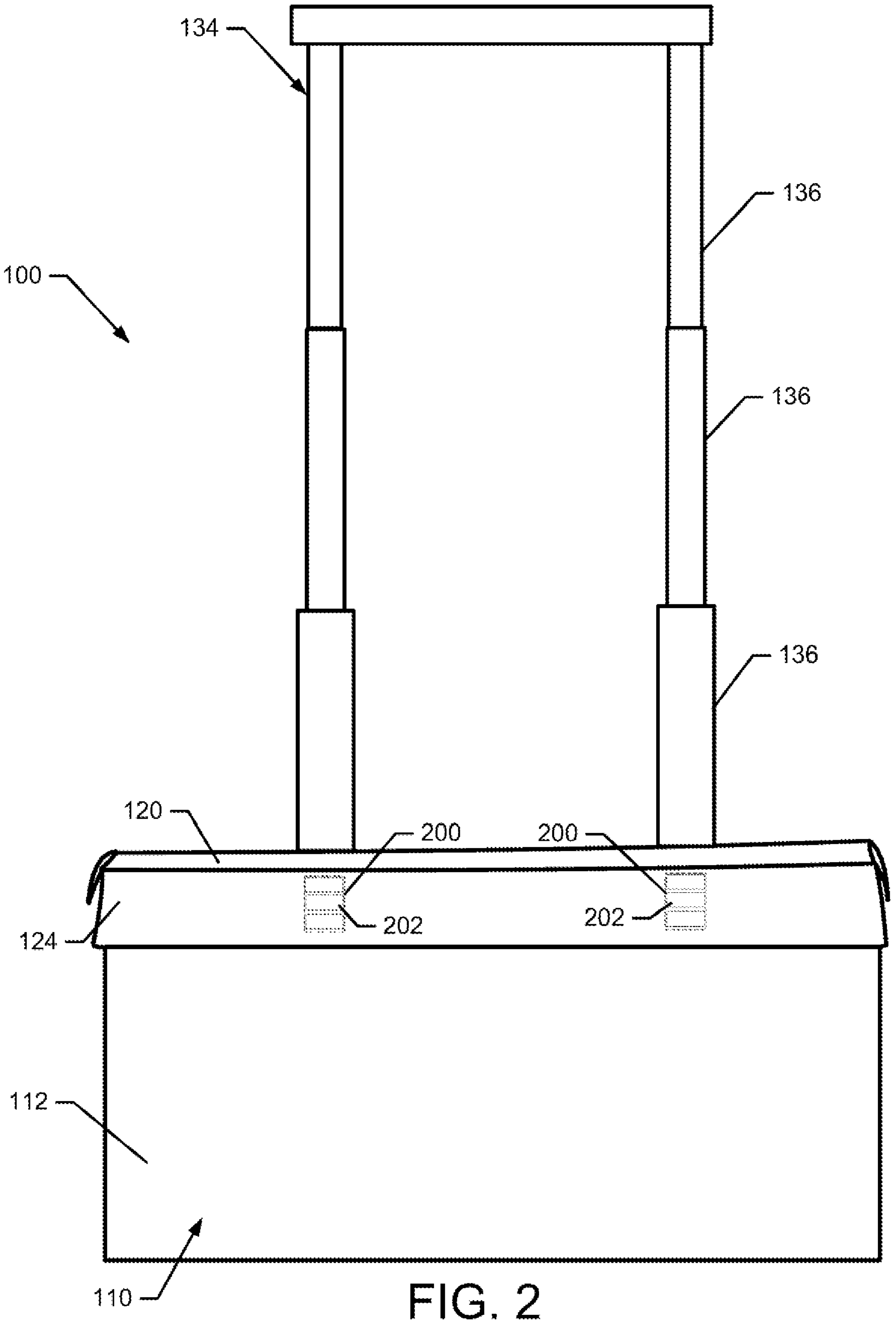
FIG. 2 illustrates a front view of the tool container with a lid in a closed position according to an example embodiment.
Figure 3:
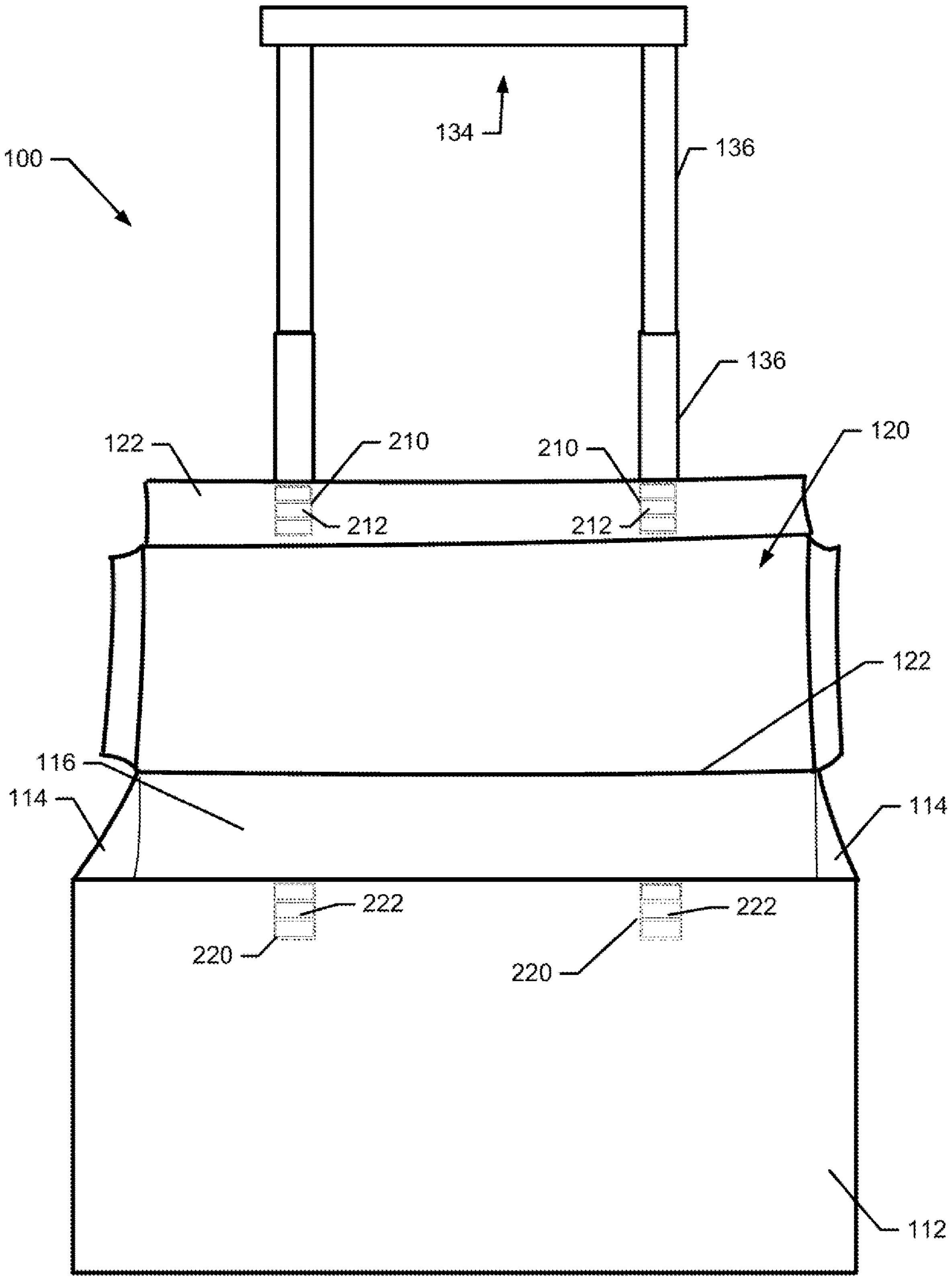
FIG. 3 illustrates a front view of the tool container with the lid in an opened position according to an example embodiment.

FIG. 1 illustrates a side perspective view of a tool bag 100, which is one example of a tool container of an example embodiment. Meanwhile, FIG. 2 illustrates a front view of the tool bag 100 in a closed state, and FIG. 2 illustrates a front view of the tool bag 100 in an opened state. The tool bag 100 includes a container portion 110 and a lid 120 that interfaces (via hinge portion 122) with the container portion 110 to enable the tools inside the container portion 110 to be completely enclosed therein. While the container portion 110 of FIGS. 1-3 is generally shown to have a rectangular box shape, it should be appreciated that the container portion 110 could take any suitable shape. However, the lid 120 is generally hingedly attached to a top of the container portion 110 in most cases.

In the example of FIGS. 1-3, due to the boxed form of the container portion 110, it can be appreciated that the container portion 110 may include a front wall 112 and side walls 114 in addition to a bottom wall and rear wall 116. To enhance mobility of the tool bag 100, the bottom and/or rear wall 116 may be operably coupled to a mobility assembly 130, which in this example is defined by a pair of wheels 132, and a handle assembly 134. The handle assembly 134 of this example is a telescopic handle that include telescoping segments 136. The telescoping segments 136 are generally extendable simply by pulling upward on the handle assembly 134, and may be collapsible after activating an actuator (not shown) on the handle assembly 134. FIG. 1 shows the handle assembly 134 collapsed, and FIGS. 2 and 3 show the handle assembly 134 extended.

The telescoping segments 136 are sequentially larger in diameter at lower portions of the handle assembly 134 so that each higher segment fits inside an adjacent lower segment. The telescoping segments 136 are normally made from metallic materials (e.g., steel or other ferrous or magnetic materials). For example, the telescoping segments 136 may be hollow metallic tubes that can take virtually any shape. Some example embodiments may employ a rectangular prism shape in order to increase the flat surface area that faces the lid 120 when the lid 120 is being retained in the opened position as described in greater detail below. The telescoping segments 136 may be extended to the positions shown in FIGS. 2 and 3 and the tool bag 100 may then be rolled along by pulling the handle assembly 134 such that the tool bag 100 rolls on the wheels 132. However, it should be appreciated that in most cases, transport of the tool bag 100 should be expected to be performed with the lid 120 in the closed position, as shown in FIG. 2, rather than the opened position shown in FIG. 3.

In an example embodiment, one or more of the front wall 112, side walls 114, bottom wall the rear wall 116 may include a rigid plastic reinforcement. One or more of the front wall 112, side walls 114, bottom wall the rear wall 116 may include fabric lining with or without padding material therein. The fabric lining may be a synthetic polymer such as a polyolefin, polyester, polyamide, or combinations thereof, among other possible materials that could be employed. The rigid plastic reinforcement may, in some cases, constitute the entirety of the corresponding component, and may be made, for example, of hard polypropylene. In some cases, the entire bottom wall and any rigid plastic reinforcement inside fabric portions of the side walls 114, front all 112 and rear wall 116 may be hard polypropylene.

The lid 120 may also be made entirely or substantially of fabric lining, padding and/or polypropylene, as described above. In some cases, the hinge portion 122 may be a living hinge formed of the fabric material used to partially or completely form the rear wall 116 and the lid 120. In some cases, the lid 120 may include an overlap portion (e.g., flap 124) that may extend at least partially over another portion of the container portion 110. In this example, the flap 124 overlaps with a top portion of the front wall 112. However, other overlapping arrangements are also possible. The lid 120 (and/or flap 124) may include a rigid support member like the rigid plastic reinforcement discussed above in connection with any of the walls of the container portion 110.

As shown in FIGS. 1 and 2, when the lid 120 is closed, it may be desirable to provide some retention mechanism to hold the lid closed. Although a number of method may be employed, example embodiments may utilize a magnetic retention assembly as described in greater detail below. In this regard, the magnetic retention assembly may be configured to securely hold the flap 124 against the front wall 112 when the lid is in the closed position, and hold the flap 124 against the handle assembly 134 (e.g., to one of the telescoping segments 136) when the lid is in the opened position.

In an example embodiment, the magnetic retention assembly may take a number of different forms. In some cases, the magnetic retention assembly may take the form of a magnetic strip 200 disposed in the flap 124 in an area thereof that corresponds to a locations of one of the telescoping segments 136, when the handle assembly 134 is in the extended position shown in FIGS. 2 and 3. Although only one such magnetic strip 200 is required, it may be desirable to include two instances of the magnetic strip 200, so that each respective instance is aligned with a corresponding one of the telescoping segments 136 when the lid 120 is in the opened position (as shown in FIG. 3). Thus, it can be appreciated that the two instances of the magnetic strip 200 that are shown in FIG. 2 are magnetically attracted to the metal of the telescoping segments 130 in FIG. 3 to hold the lid 120 in the opened position.

The two instances of the magnetic strip 200 may be disposed inside fabric material that forms the flap 124, so that the magnetic strip 200 can operate to attract the lid 124 to the telescoping segments 136 in the opened position (of the lid 120), and to attract the lid 124 to the front wall 112 in the closed position. In such an example, the flap 124 may be made entirely of fabric material, and the magnetic strip 200 may be disposed in the middle between inner and outer facing layers of the fabric material. However, in some cases, the flap 124 may be more robust (or thicker), and therefore it may be desirable to include separate magnetic strips facing inwardly and outwardly with respect to the flap 124.

In this regard, for example, if the flap 124 includes rigid plastic or padding between the inner and outer facing layers of the fabric material, the flap 124 may further include the magnetic strip 200 (e.g., as a first magnetic strip) on one side of the rigid plastic or padding, and therefore facing outwardly, while a second magnetic strip 210 is disposed on the other side of the rigid plastic or padding, and therefore facing inwardly (in reference to the closed position of the lid 120). The second magnetic strip 210 (and actually two instances thereof) is shown in use in FIG. 3.

Each of the magnetic strip 200 and the second magnetic strip 210 could either be made of a single magnet or multiple magnets adjacent to each other. FIGS. 2 and 3 illustrate individual magnet elements 202 and 212 that may combine to form the magnetic strip and the second magnetic strip 200 and 210, respectively, in some examples.

Given that the telescoping segments 136 may be metallic, the two instances of the magnetic strip 200 shown in FIG. 2 may be magnetically attracted to each respective one of the telescoping segments 136 to hold the lid 120 open as shown in FIG. 3. Meanwhile, the two instances of the magnetic strip 200 shown in FIG. 2 may also hold the lid 120 closed, as shown in FIG. 2. Alternatively, the two instances of the second magnetic strip 210 of FIG. 3 may hold the lid closed. In either case, a top portion of the front wall 112 may include ferrous or magnetic material 220 that is positioned thereon to correspond to the location of the magnetic strip 200 or second magnetic strip 210. The ferrous or magnetic material 220 may be either a metal strip (or strips), or a magnetic strip (made of one or more magnetic elements). In this regard, the individual elements 222 shown in FIG. 3 are merely one example. Moreover, it may be appreciated that one continuous ferrous or magnetic strip may extend across the front wall 112 to interact with both instances of the either the magnetic strip 200 or second magnetic strip 210.

Figure 4:
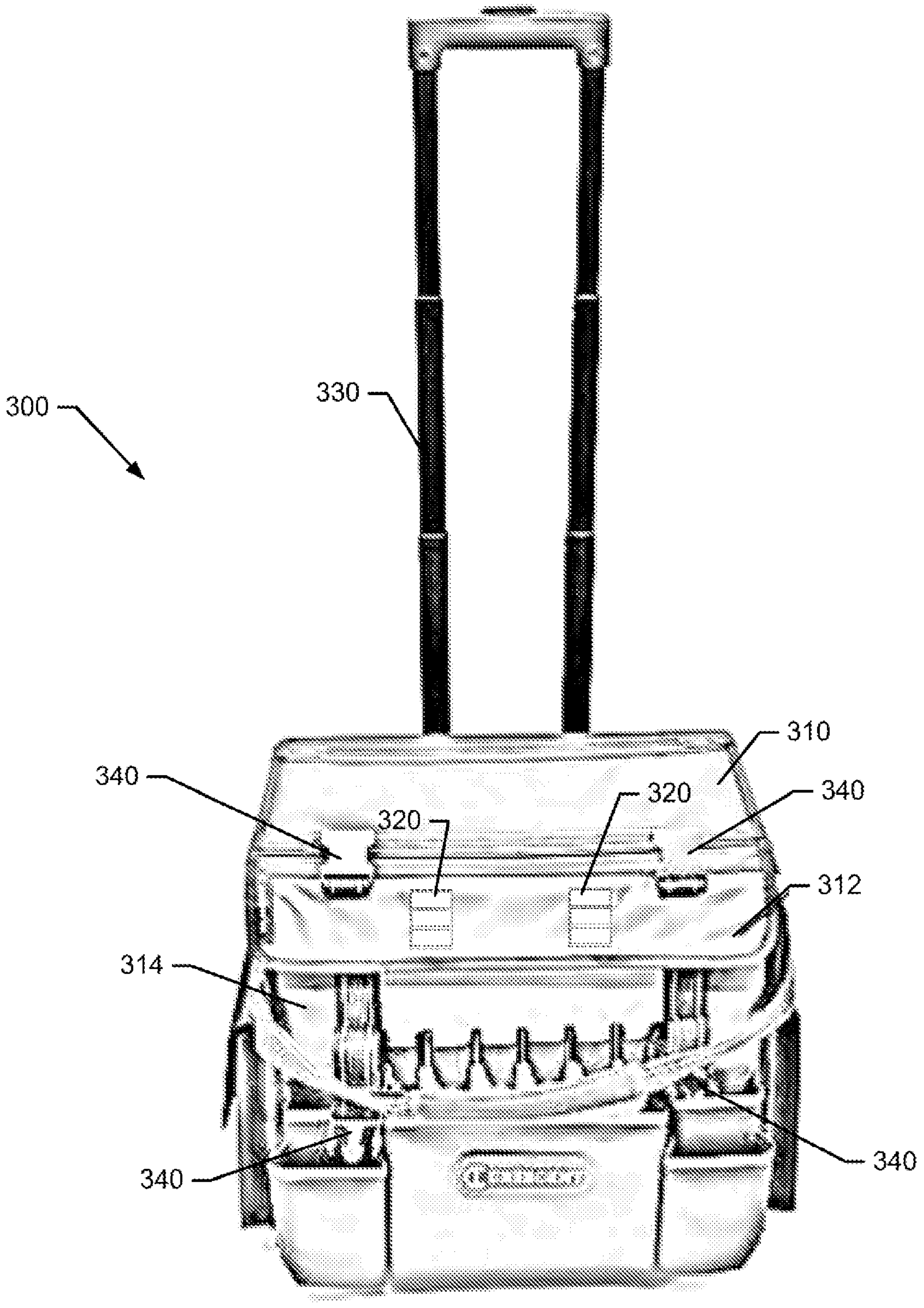
FIG. 4 illustrates a front view of a tool bag having a lid in the closed position according to an example embodiment.
Figure 5:
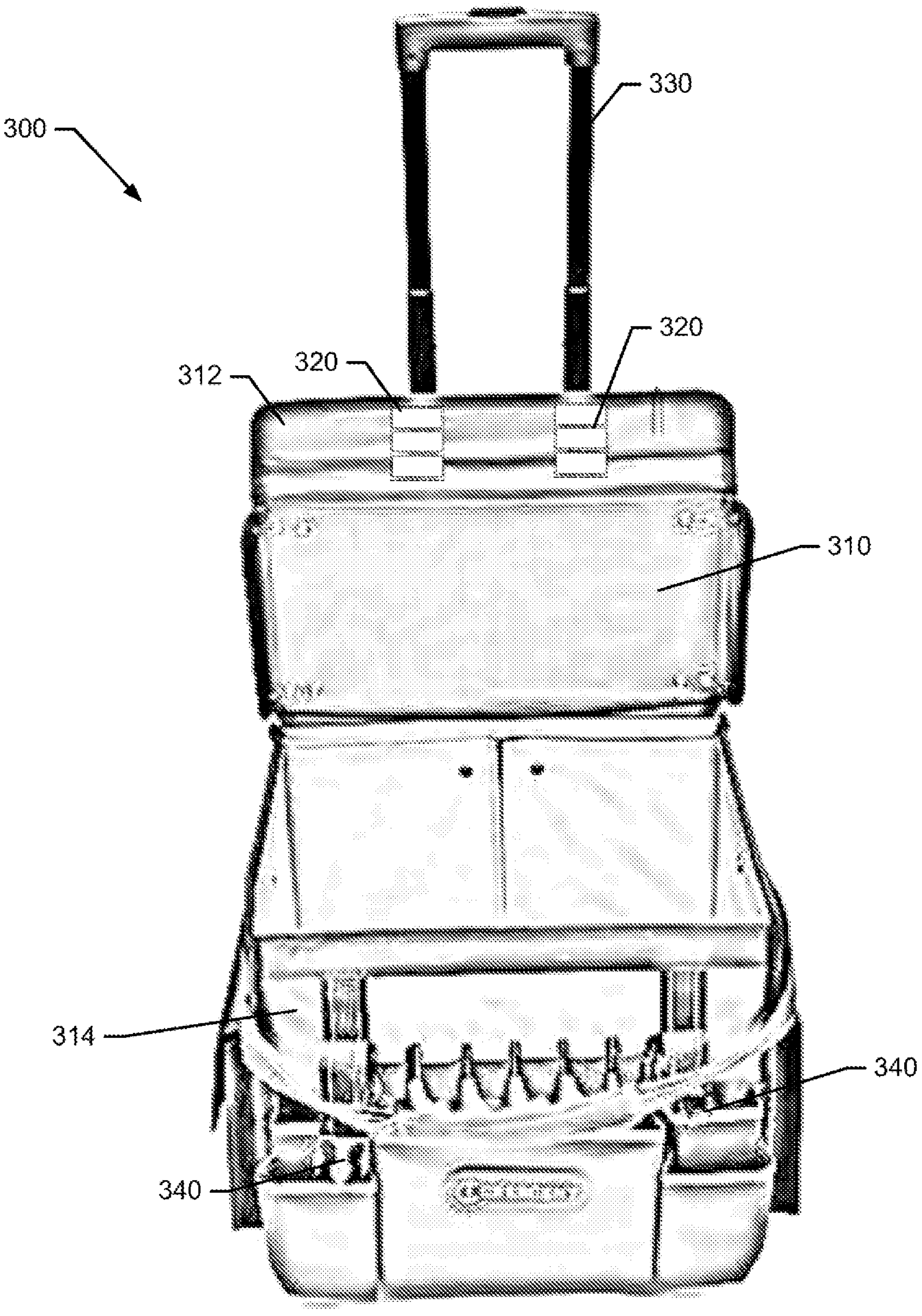
FIG. 5 illustrates the tool bag of FIG. 4 with the lid in an opened position according to an example embodiment.

With any of the structures described above, the lid 120 can be maintained in the opened position, which is normally not possible with conventional tool bags. Moreover, the magnetic retention assembly of example embodiments may be multifunctional in that it both provides the unique function of holding the lid 120 open, but also enables the lid 120 to be held closed. Thus, other closure mechanisms may either be permanently or temporarily unused or not even included in the design. For example, FIGS. 4 and 5 illustrate another example of a tool bag 300 in closed and opened positions, respectively.

The tool bag 300 includes a lid 310 with a flap 312 that extends over the top of the front wall 314. The flap 312 includes magnetic strips 320 that attach to respective portions of handle 330. However, the tool bag 300 includes an alternative closure method of a releasable buckle or clasp assembly 340. The clasp assembly 340 may provide a more robust closure method than the magnetic strips 320 discussed above. Thus, the clasp assembly 340 (or another lockable closure method) may be desired for transport over long distances, or during long term storage. However, during use, the clasp assembly 340 may be left unfixed (or unlocked), and the retaining of the lid 310 in the opened or closed position may be accomplished using the magnetic strips 320 when the tool bag 300 is not in transport or is in use.

In an example embodiment, a tool container (e.g., a tool bag) is provided. The tool container is provided. The a container portion may include a front wall, sidewalls, and a rear wall. The tool container may further include a lid hingedly attached to the rear wall, and a magnetic retention assembly configured to hold the lid in an opened position. In some cases, the magnetic retention assembly may be configured to both hold the lid open, and hold the lid proximate to the front wall when the lid is in a closed position. In some cases, the tool container may further include a mobility assembly including wheels and a handle assembly, and the magnetic retention assembly may be configured to hold the lid proximate to the handle assembly to retain the lid in the opened position.

The tool container may be modified or augmented with additional (optional) features. Some examples of such modified, augmented or optional features are described below. The features described below can be included in any order or combination. In other words, individual ones of the features below can be added to the tool container either singly, in any combination, or with all such features being included. Such features may include, for example, the magnetic retention assembly may include a first magnetic strip disposed at a flap of the lid. The flap may overlap with at least a portion of the front wall of the container portion when the lid is in the closed position. In some cases, the first magnetic strip may be disposed at a portion of the flap that corresponds to a location of one of the telescoping segments of the handle assembly when the handle assembly is in the extended position. In an example embodiment, the magnetic retention assembly may further include a second magnetic strip disposed at the flap of the lid. The first magnetic strip may be disposed on an outside facing portion of the flap when the lid is in the closed position, and the second magnetic strip may be disposed on an inside facing portion of the flap when the lid is in the closed position. In some examples, the front wall may further include a third magnetic strip, and the third magnetic strip may be disposed at a top portion of the front wall to interface with the second magnetic strip when the lid is in the closed position. In an example embodiment, the magnetic strip may be disposed at a portion of the flap that corresponds to a location of one of a first metallic portion of the handle assembly and a second metallic portion disposed at the front wall. In some examples, the magnetic retention assembly may include a first magnetic strip disposed in the flap of the lid, and the first magnetic strip may be disposed at a portion of the flap that corresponds to a location of one of a metallic portion of the handle assembly and a second magnetic strip disposed at the front wall. In an example embodiment, the magnetic retention assembly may include a plurality of magnets retained inside fabric material of the lid. In some cases, the tool container may be a tool bag in which the lid, the front wall, the sidewalls, and the rear wall each are made of fabric material. In an example embodiment, the lid may be operably coupled to the rear wall via a living hinge.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tool container comprising:

a container portion comprising a front wall, sidewalls, and a rear wall;

a lid hingedly attached to the rear wall, pivotable between an opened position and a closed position;

a mobility assembly comprising wheels and a handle assembly; and a magnetic retention assembly configured to hold the lid proximate to the handle assembly to retain the lid in the opened position, wherein the magnetic retention assembly comprises:

a first magnetic strip disposed at a flap of the lid, the flap overlapping with at least a portion of the front wall of the container portion when the lid is in the closed position; and a second magnetic strip disposed at the portion of the front wall of the container portion, wherein responsive to the lid being in the opened position, the first magnetic strip aligns with and magnetically operably couples to the handle assembly to hold the lid in the opened position, and wherein responsive to the lid being in the closed position, the first magnetic strip aligns with and magnetically operably couples to the second magnetic strip to hold the lid in the closed position.

2. The tool container of claim 1, wherein the handle assembly comprises a plurality of telescoping segments extendible between an extended position and a collapsed position, and wherein the first magnetic strip is disposed at a portion of the flap that corresponds to a location of one of the telescoping segments of the handle assembly when the handle assembly is in the extended position.

3. The tool container of claim 1, wherein the magnetic retention assembly is configured to hold the lid proximate to the handle assembly to retain the lid in the opened position and hold the lid proximate to the front wall when the lid is in the closed position.

4. The tool container of claim 1, wherein the magnetic retention assembly comprises a plurality of magnets retained inside fabric material of the lid.

5. The tool container of claim 1, wherein the tool container is a tool bag, and the lid, the front wall, the sidewalls, and the rear wall each comprise fabric material.

6. A tool bag comprising:
a container portion comprising a front wall, sidewalls, and a rear wall;
a lid hingedly attached to the rear wall, pivotable between an opened position and a closed position;
a handle assembly comprising a plurality of telescoping segments extendible between an extended position and a collapsed position; and
a magnetic retention assembly configured to hold the lid proximate to the front wall when the lid is in the closed position and also hold the lid in the opened position,
wherein the magnetic retention assembly comprises:
a first magnetic strip disposed at a flap of the lid, the flap overlapping with at least a portion of the front wall of the container portion when the lid is in the closed position; and
a second magnetic strip disposed at the portion of the front wall of the container portion,
wherein responsive to the lid being in the closed position, the first magnetic strip aligns with and magnetically operably couples to the second magnetic strip to hold the lid in the closed position, and
wherein responsive to the lid being in the opened position, the first magnetic strip aligns with and magnetically operably couples to the handle assembly to hold the lid in the opened position.

7. The tool bag of claim 6, further comprising a mobility assembly comprising wheels,
wherein the first magnetic strip is disposed at a portion of the flap that corresponds to a location of one of the telescoping segments of the handle assembly when the handle assembly is in the extended position.

8. The tool bag of claim 6, wherein the magnetic retention assembly comprises a plurality of magnets retained inside fabric material of the lid.

9. The tool bag of claim 6, wherein the tool container is a tool bag, and the lid, the front wall, the sidewalls, and the rear wall each comprise fabric material.

10. The tool bag of claim 9, wherein the lid is operably coupled to the rear wall via a living hinge.

11. The tool container of claim 1, wherein the magnetic retention assembly further comprises:
a third magnetic strip disposed at a flap of the lid, the flap overlapping with at least the portion of the front wall of the container portion when the lid is in the closed position; and
a fourth magnetic strip disposed at the portion of the front wall of the container portion.

12. The tool container of claim 11, wherein responsive to the lid being in the opened position, the third magnetic strip aligns with and magnetically operably couples to the handle assembly to hold the lid in the opened position, and
wherein responsive to the lid being in the closed position, the third magnetic strip aligns with and magnetically operably couples to the fourth magnetic strip to hold the lid in the closed position.

13. The tool bag of claim 6, wherein the magnetic retention assembly further comprises:
a third magnetic strip disposed at a flap of the lid, the flap overlapping with at least the portion of the front wall of the container portion when the lid is in the closed position; and
a fourth magnetic strip disposed at the portion of the front wall of the container portion.

14. The tool bag of claim 13, wherein responsive to the lid being in the closed position, the third magnetic strip aligns with and magnetically operably couples to the fourth magnetic strip to hold the lid in the closed position.

15. A tool container comprising:
a container portion comprising a front wall, sidewalls, and a rear wall;
a lid hingedly attached to the rear wall;
a mobility assembly comprising wheels and a handle assembly; and
a magnetic retention assembly configured to hold the lid proximate to the handle assembly to retain the lid in an opened position,
wherein the magnetic retention assembly comprises a first magnetic strip disposed at a flap of the lid, the flap overlapping with at least a portion of the front wall of the container portion when the lid is in a closed position,
wherein the magnetic retention assembly further comprises a second magnetic strip disposed at the flap of the lid, the first magnetic strip being disposed on an outside facing portion of the flap when the lid is in the closed position, and the second magnetic strip being disposed on an inside facing portion of the flap when the lid is in the closed position, and
wherein the front wall further comprises a third magnetic strip, the third magnetic strip being disposed at a top portion of the front wall to interface with the second magnetic strip when the lid is in the closed position.

16. The tool container of claim 15, wherein the handle assembly comprises a plurality of telescoping segments extendible between an extended position and a collapsed position, and
wherein the first magnetic strip is disposed at a portion of the flap that corresponds to a location of one of the telescoping segments of the handle assembly when the handle assembly is in the extended position.

17. The tool container of claim 15, wherein responsive to the lid being in the opened position, the first magnetic strip aligns with and magnetically operably couples to the handle assembly to hold the lid in the opened position.

18. The tool container of claim 15, wherein the magnetic retention assembly comprises a plurality of magnets retained inside fabric material of the lid.

19. The tool container of claim 15, wherein the tool container is a tool bag, and the lid, the front wall, the sidewalls, and the rear wall each comprise fabric material.

20. The tool container of claim 19, wherein the lid is operably coupled to the rear wall via a living hinge.

* * * * *